United States Patent [19]

Yoshimaru et al.

[11] Patent Number: 5,249,170
[45] Date of Patent: * Sep. 28, 1993

[54] MEMORY DISK AND APPARATUS FOR RECORDING INFORMATION ON MEMORY DISK

[75] Inventors: Tomohisa Yoshimaru; Tsuneshi Yokota, both of Kanagawa; Hideo Kumagai, Tokyo, all of Japan

[73] Assignee: Kabushiki Kaisha Toshiba, Kanagawa, Japan

[ * ] Notice: The portion of the term of this patent subsequent to Oct. 15, 2008 has been disclaimed.

[21] Appl. No.: 486,925

[22] Filed: Mar. 1, 1990

[30] Foreign Application Priority Data

Mar. 1, 1989 [JP] Japan ................................. 1-049416

[51] Int. Cl.$^5$ ............................................. G11B 7/00
[52] U.S. Cl. ........................................ 369/48; 369/32; 369/58; 369/54; 358/342
[58] Field of Search ......................... 369/32, 48, 50, 51, 369/54, 58, 53, 59, 111; 360/48; 358/342

[56] References Cited

U.S. PATENT DOCUMENTS

| 4,357,635 | 11/1982 | Hasegawa . | |
|---|---|---|---|
| 4,532,621 | 6/1985 | Nakagawa . | |
| 4,550,347 | 10/1985 | Nakamuta | 369/50 |
| 4,751,693 | 6/1988 | Yoshimaru | 369/32 |
| 4,761,772 | 8/1988 | Murakami | 369/32 |
| 4,789,979 | 12/1988 | Hiraoka et al. | 369/32 |
| 4,839,746 | 6/1989 | Kanamaru | 358/342 |
| 4,839,882 | 6/1989 | Janssen | 358/342 |
| 4,984,227 | 1/1991 | Yoshimaru | 369/58 |
| 5,010,539 | 4/1991 | Terashima et al. | 369/50 |
| 5,058,089 | 10/1991 | Yoshimaru et al. | 369/58 |

Primary Examiner—Tommy P. Chin
Assistant Examiner—Khoi Truong
Attorney, Agent, or Firm—Banner, Birch et al.

[57] ABSTRACT

A memory device for recording information on a recording medium includes a recording mechanism for recording information on the recording medium. A control device controls the recording mechanism such that information is recorded in a first predetermined arrangement on a first portion of the recording medium and in a second predetermined arrangement on a second portion of the recording medium.

12 Claims, 7 Drawing Sheets *

MEMORY DISK AND APPARATUS FOR RECORDING INFORMATION ON MEMORY DISK

CROSS-REFERENCE TO RELATED APPLICATIONS

The present application is related by subject matter to commonly assigned, copending application Ser. No. 07/486,830 entitled "Optical Memory and Apparatus" and application Ser. No. 07/486,847 entitled "Optical Memory and Apparatus", both filed concurrently herewith.

BACKGROUND OF THE INVENTION

1. Field of the Invention

The present invention generally relates to an optical memory and an apparatus for recording and reading an optical memory and, more particularly, to an improved optical memory and an apparatus for recording and reading data quickly and accurately.

2. Description of the Related Art

Optical memories having a layer or film of semiconductor materials are widely used in industrial and consumer recording systems such as video recorders, digital audio recorders, and document digital recorders. A signal is recorded on the optical disc by irradiation with a laser beam to form bits of information or data in the layer of semiconductor materials. The optical disc permits direct reading after the information has been recorded and random access to the information. Optical discs may also be used for erasable recording.

There are different techniques by which information may be recorded using optical discs. These techniques include ablation, topography change, chemical reaction, particle coalescence, phase change, and magnetization change. For the first five techniques, the optical contrast is obtained by the difference in reflectivity between the recorded and unrecorded states. In magnetization change, the optical contrast is obtained from the change in the direction of the polarization of light due to the change in the polarity of magnetization in a recorded area.

These recording techniques are known in the art and will not be discussed in detail here. Briefly, ablation utilizes a laser to selectively melt the recording medium. The surface tension of the molten liquid pulls the film away from the center, resulting in the formation of a hole. Optical media on which data is recorded by a topography change include bubble forming media. A bubble is formed due to either gas evolution from the underlying polymer or the microswelling of the metal or polymer layer upon laser irradiation. In chemical reaction recording, a laser-induced chemical reaction is initiated between two initially discrete layers. In particle coalescence, a very thin and discontinuous metal film is subjected to laser irradiation to induce a coalescence of metal particles. In phase changes, the optical properties of the recording medium are changed by inducing phase changes therein. Depending on the laser characteristics, the recording medium exhibits two different reflectances and the change between the two states may be reversible. The reversible change may, for example, be an amorphous to crystalline phase transition. In magnetization, the area irradiated with the laser exhibits a changed direction of magnetization. A linearly polarized laser light of low intensity is used to sense the change in magnetic direction.

So-called image filing systems are widely used as business machines for recording and reproducing document data. In these image filing systems, image data is first optically read from a document, and is then recorded onto a recording medium. The image data recorded onto the recording medium may be read therefrom and subsequently reproduced on a display unit for visual presentation or supplied to a printer to produce a hard copy.

Optical disc devices used in these image filing systems employ optical discs to record and store the image data. Image data is recorded in spiral tracks on the surface of the optical disc. An optical head records and reads out image data on the optical disc. The optical head is positioned close to the optical disc and is driven by a linear motor so as to rectilinearly move in the radial direction of the optical disc.

Two methods have been developed to record and read image data on an optical disc. The first method is a so-called constant linear velocity (CLV) method, and the second method is a so-called constant angular velocity (CAV) method. In the CLV method, the optical disc is rotated such that the angular velocity of the disc is decreased as the optical head is moved radially outward from the center portion to the peripheral portion of the optical disc. The CLV method ensures that all tracks on the optical disc move at a constant speed relative to the optical head.

Thus, in the CLV method the angular velocity of the optical disc changes with the radial position of the optical head as the head is moved above the surface of the optical disc. However, in order to access image data on the disc, the angular velocity of the disc must reach a constant value which requires that a relatively long period of time elapse. Thus, the CLV method requires a long access time and exhibits a slow data transfer speed.

In the CAV method, the angular velocity of the optical disc is maintained at a constant value in order to stabilize the recording and reading operations and to reduce access time. However, since the angular velocity of the optical disc is constant, image data becomes less dense with increasing radius. Thus, the CAV method does not lend itself to the production of high density optical discs.

Some improvements have been proposed for the CLV method. In one improvement, the angular velocity of the optical disc is set to a constant value. The frequency of a system clock is then varied in accordance with the position for recording and reading data such that the data are formed with a predetermined constant spacing therebetween along the tracks. Hereinafter, this method will be referred to as the Constant Linear Density (CLD) method.

In the CLD method, the frequency of the clock is increased as the optical head is moved radially outwardly. However, it becomes difficult to control the high clock frequency as the optical head is located adjacent the outermost radial portions of the disc and recording quality decreases.

SUMMARY OF THE INVENTION

Accordingly, it is an object of the present invention to provide an optical memory device for producing high density optical memories.

It is another object of the present invention to provide an optical memory device for quickly accessing data on an optical memory.

It is another object of the present invention to provide an optical memory device which can record data stably on the entire of an optical memory.

In accordance with the present invention, a memory device for recording information on a recording medium is provided. The memory device includes a recording mechanism for recording information on the recording medium. A control device controls the recording mechanism such that information is recorded in a first predetermined arrangement on a first portion of the recording medium and in a second predetermined arrangement on a second portion of the recording medium.

The present invention also discloses a method of recording information on a recording medium having a plurality of recording positions arranged in a plurality of tracks. First, information is recorded on a first area of the recording medium such that the recording positions of a given track have a predetermined substantially constant spacing therebetween. Next, information is recorded on a second area of the recording medium such that the recording positions of a given track have a spacing therebetween determined by the location of the given track on the recording medium.

The present invention also discloses a memory including a recording medium having a plurality of recording positions arranged in a plurality of tracks in which information is recorded. The recording medium has a first recording area in which recording positions have a predetermined substantially constant spacing therebetween and a second recording area in which the recording positions have a spacing therebetween determined by the position of a respective recording position on the recording medium.

BRIEF DESCRIPTION OF THE DRAWINGS

Other objects and many of the attendant advantages of this invention will be readily appreciated as the invention becomes better understood by reference to the following detailed description when considered in connection with the accompanying drawings, in which like reference characters designate the same or similar parts throughout the figures.

DETAILED DESCRIPTION OF THE PREFERRED EMBODIMENT

Figure 1:
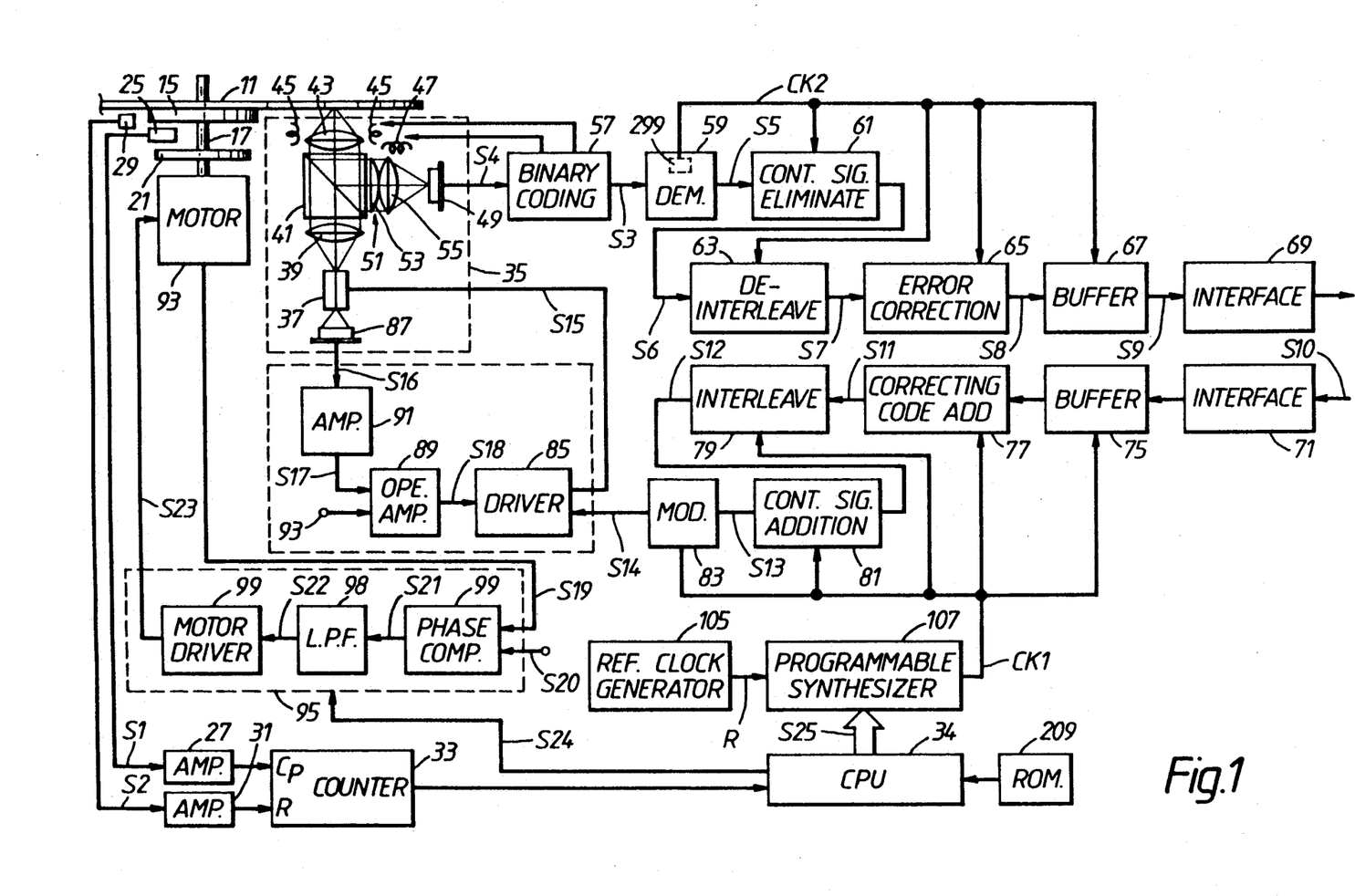
FIG. 1 is a circuit diagram of an optical disc device in accordance with the present invention.

Referring to FIG. 1, an optical disc device of the present invention uses an optical disc 11 as a recording medium. Optical disc 11 comprises a disc plate of glass or plastic and a metal film of a tellurium bismuth alloy layered thereon. Optical disc 11 has a cutaway reference position mark 13 formed near the center of the metal film. Although the disclosed embodiment includes a recording layer of a tellurium bismuth alloy in which information is recorded by the formation of pits, it will be apparent to those skilled in the art that the invention is not limited in this respect. As discussed above, various types of optical memories are known and the teachings of the present invention may be utilized for different types of optical memories.

Figure 2:
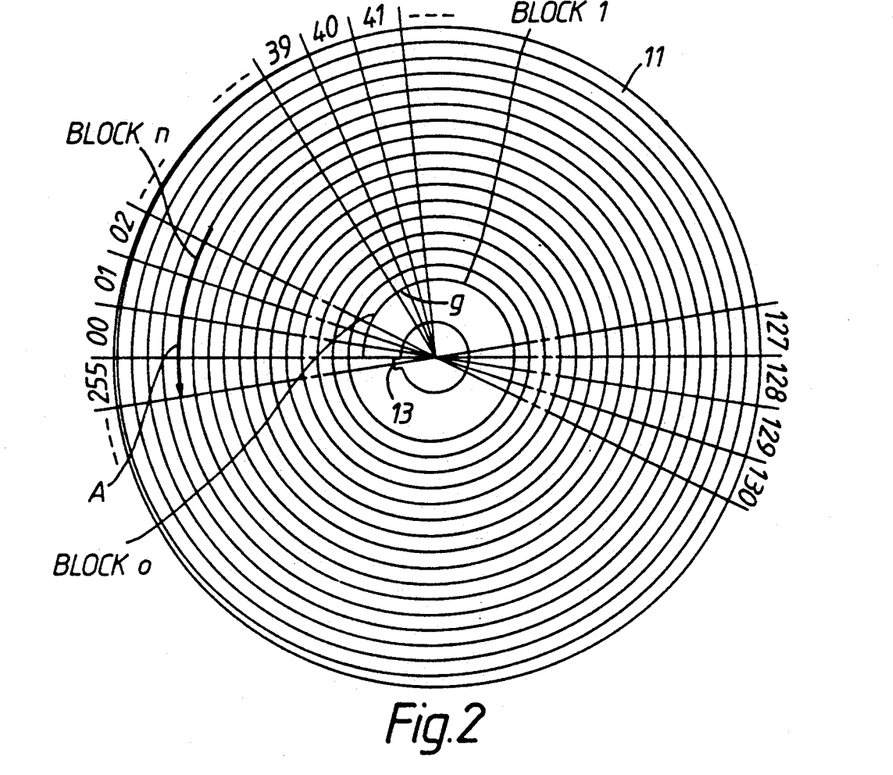
FIG. 2 is a plan view of an optical disc used in the optical disc device illustrated in FIG. 1.

The surface of optical disc 11 is divided into a plurality of sectors, for example, 256 sectors numbered 0 to 255. The sectors are consecutively numbered beginning with 0 at reference position mark 13 and increasing in a clockwise direction. A helical groove is formed on the recording area of optical disc 11 extending from an inner portion of the disc to an outer portion thereof. The helical groove is segmented into a plurality of tracks, for example 36,000 tracks, each track being one turn of the groove of optical disc 11. The tracks are consecutively numbered from 0 to 35,999.

These 36,000 tracks are segmented into a total of 300,000 blocks. Each block includes a plurality of sectors. The number of sectors of a track on an inner portion of the disc is different than the number of sectors of a track on an outer portion of the disc. If a track does not terminate exactly at the boundary between respective sectors for a given amount of information or data, a block gap g is provided between the end of the one sector and the beginning of the next sector. For example, with reference to FIG. 2, Block 0 terminates prior to sector 40 of Block 1 and thus a block gap g is provided in the final sector 39 of Block 0. Thus, each block of optical disc 11 starts at the beginning of a sector. A block header including a block number, a track number, and the like is recorded in a header portion of each block. A block header indicated at A is recorded when data is recorded onto optical disc 11 of FIG. 2.

Figure 3:
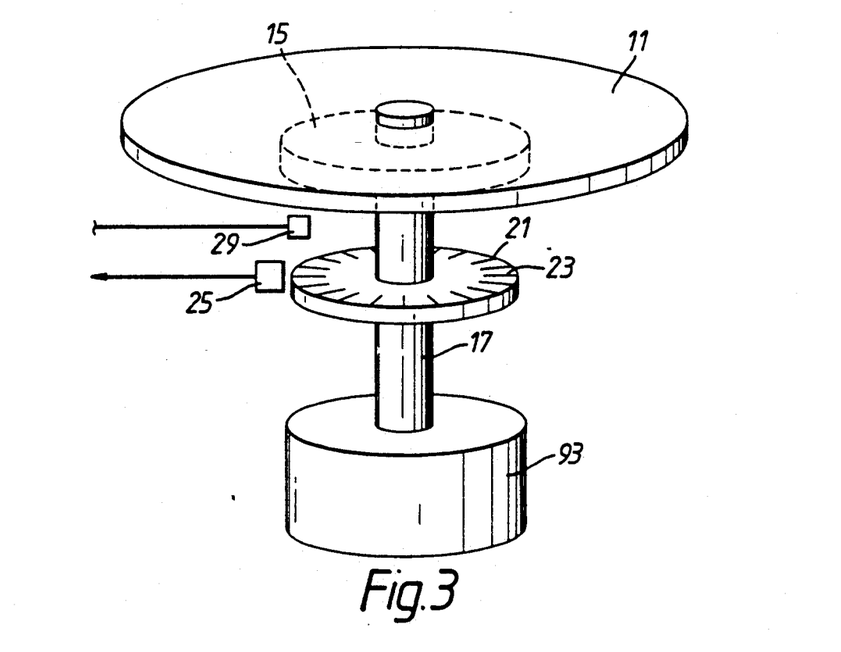
FIG. 3 is a perspective view of an optical disc drive mechanism used in the optical disc device illustrated in FIG. 1.

With reference to FIG. 3, optical disc 11 is placed on turn table 15 which is coupled to shaft 17 of motor 93. Clock disc 21 is also mounted on shaft 17. Sector markers 23 are provided on the outer peripheral portion of clock disc 21 at predetermined constant intervals, each sector marker corresponding to a respective one of sectors 00 to 255 on optical disc 11. Sector markers 23 are optically detected by sector marker detector 25 which includes a photointerrupter. Sector marker detector 25 is coupled to an input terminal of amplifier 27 as shown in FIG. 1.

Reference mark detector 29 which detects reference position mark 13 of optical disc 11 is positioned under optical disc 11. Reference mark detector 29 includes a photo interrupter. An output terminal of reference mark detector 29 is coupled to amplifier 31. The respective output terminals of amplifiers 27 and 31 are coupled to sector counter 33. Sector counter 33 counts the number of sectors in response to a sector mark signal S1 associated with sector markers 23 and a reference mark signal S2 associated with reference position mark 13, these signals being respectively derived from detectors 25 and 29. Sector counter 33 is incremented in response to each sector mark signal S1. Sector counter 33 outputs a signal in accordance with the count to CPU 34 and is reset by reference mark signal S2.

An optical head 35 is positioned close to a planar surface of optical disc 11. Optical head 35 is mounted to a carrier of a linear motor (not shown) for moving optical head 35. The linear motor is coupled to a motor driver (not shown) for driving optical head 35. When the linear motor is driven by the motor driver, optical head 35 is moved radially over the surface of optical disc 11.

Optical head 35 includes a semiconductor laser 37 for emitting a laser beam. A collimating lens 39 collimates the laser beam from semiconductor laser 37. Splitter 41 splits the laser beam which has passed through collimating lens 39. The split laser beam is focused on the surface of optical disc 11 by an objective lens 43. First lens actuator 45 moves objective lens 43 along an optical axis of objective lens 43 (up and down in FIG. 1). Second lens actuator 47 moves objective lens 43 in a direction perpendicular to the optical axis of objective lens 43 (side to side in FIG. 1).

Objective lens 43 causes the beam reflected from the surface of optical disc 11 to be parallel to the laser beam emitted by the laser and to return to splitter 41. The parallel beam is focused on photosensor 49 through antigmatic unit 51 which includes cylindrical lens 53 and convex lens 55. Photosensor 49 includes four photoelectric elements (not shown). The outputs of these photoelectric elements control the position of objective lens 43. That is, first and second lens actuators 45 and 47 are responsive to the outputs of the four photoelectric elements.

An output terminal of photosensor 49 is coupled to an input terminal of binary coding circuit 57 which generates a binary signal S3 in response to an output signal 54 of photosensor 49. Binary coding circuit 57 performs two functions. One function is to focus objective lens 45 on optical disc 11 by controlling the movement of first lens actuator 45 in response to signal 54. The other function is to provide small corrective movements to the radial position of optical head 35 through the movement of objective lens 43 by second lens actuator 47. The details of photosensor 49 and the functioning of binary coding circuit 57 are disclosed in U.S. Pat. No. 4,682,613, incorporated herein by reference thereto.

An output terminal of binary coding circuit 57 is coupled to an input terminal of a demodulator 59 for demodulating signal S3 into a demodulated signal S5. As will be explained, according to the present embodiment, a 2-7 modulating code method is utilized.

An output terminal of demodulator 59 is coupled to an input terminal of control signal eliminating circuit 61 which detects control signals, such as a synchronous code, from signal S5 and generates a signal S6 after eliminating any control signals from signal S5.

An output terminal of control signal eliminating circuit 61 is coupled to an input terminal of de-interleave circuit 63 for de-interleaving signal S6 into signal S7. As described later, signals are recorded after interleaving. An output terminal of de-interleave circuit 63 is coupled to an input terminal of error correcting circuit 65 which corrects any error in signals S7 and generates a signal S8 with reduced error. An output terminal of error correcting circuit 65 is coupled to an input terminal of buffer 67. An output terminal of buffer 67 is coupled to an input terminal of interface circuit 69. Signals S9 output from buffer 67 are sent to a host computer (not shown) through interface circuit 69.

Interface circuit 71 receives a signal S10 supplied from the host computer containing data to be written on optical disc 11. Signal S10 is supplied to an input of correcting code addition circuit 73 through buffer 75. Correcting code addition circuit 73 adds a code for correcting signals when reading data from optical disc 11 to generate a signal S11. Correcting code addition circuit 73 and error correction circuit 65 have a complimentary relationship.

An output terminal of correcting code addition circuit 77 is coupled to an input terminal of interleave circuit 79 for interleaving signal S11 to generate an interleaved signal S12. Interleave circuit 79 shuffles signals in order to be able to correct signals after burst error as is well-known in the art.

An output terminal of interleave circuit 79 is coupled to an input terminal of control signal addition circuit 81 which adds control signals, such as synchronous code, to interleaved signal S12 in order to generate a signal S13. An output terminal of control signal addition circuit 81 is coupled to modulator 83 for modulating signal S13 to generate a modulated signal S14. As described above, a 2-7 code is utilized as the preferred modulation method.

An output terminal of modulator 83 is coupled to one of the two illustrated input terminals of driver 85 which drives semiconductor laser 37. An output terminal of driver 85 is coupled to a control terminal of semiconductor laser 37. Driver 85 generates and supplies a driving signal S15 for semiconductor laser 37 in response to signal S14.

Semiconductor laser 37 is directed at two targets. One target is collimating lens 39. The other target is photosensor 87 which is used to monitor the laser beam irradiated by semiconductor laser 37. The monitored laser beam is incident on photosensor 87 which generates signal S16 in response to the laser beam received. An output terminal of photosensor 87 is coupled to one of the input terminals of operational amplifier 89 through amplifier 91. Amplifier 91 generates signals S17 by amplifying signals S16.

Operational amplifier 89 subtracts a reference signal from signal S17 to generate signal S18. The subtracted reference voltage V is supplied at a point 94, another input terminal of operational amplifier 89. Signal S18 is supplied to another input terminal of driver 85. In response to signals S14 and S18, driver 85 generates control signal S15 which generates a laser beam of uniform intensity when driver 85 drives semiconductor laser 37.

Turn table 15 is rotated by motor 93 through shaft 17. Motor control circuit 95 controls the movement of motor 93. Motor control circuit 95 includes phase comparator 97 which compares a phase of signal S19 output by motor 93 (corresponding to the angular velocity of motor 93) with that of a reference clock signal S20 to generate a signal S21 indicative of the phase difference between signals S19 and S20. An output terminal of phase comparator 97 is coupled to an input terminal of a low pass filter (LPF) 98 which blocks the high frequency component of signal S21 to generate a signal S22 representing the phase difference between signals S19 and S20.

An output terminal of LPF 98 is coupled to an input terminal of motor driver 99 for driving motor 93, i.e., the driver 99 amplifies signal S22 into signal S23 and supplies signal S23 to a control terminal of motor 93. The operation of motor control circuit 95 is controlled by a control signal S24 from CPU 34. Motor control circuit 95, as constructed above, supplies signal S23 synchronous with reference clock signal S20 to motor 93 so that motor 93 is rotated at a constant angular velocity.

Figure 4:
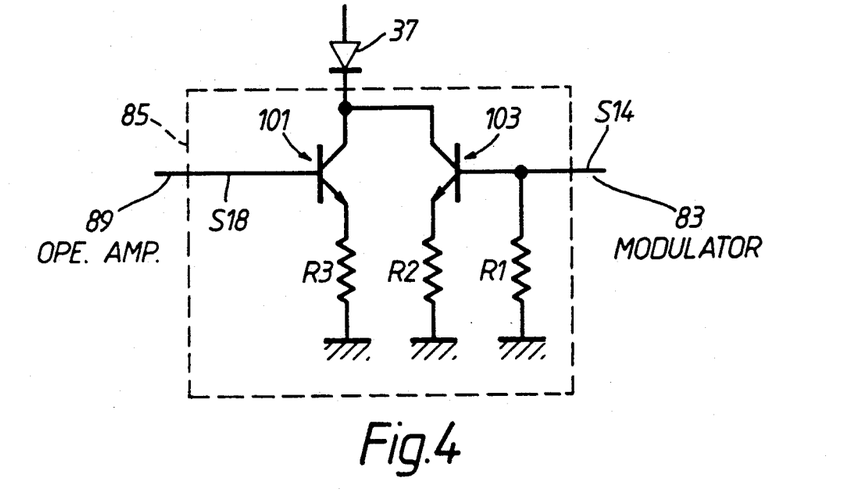
FIG. 4 is a circuit diagram of a driver used in the optical disc device illustrated in FIG. 1.

With reference to FIG. 4, the details of driver 85 will be explained. Driver 85 includes first and second transistors 101 and 103, respectively. The base of second transistor 103 is coupled to the output terminal of modulator 83 and to ground through first resistor R1. The base of first transistor 101 is coupled to the output terminal of operational amplifier 89. The respective collectors of first and second transistors 101 and 103 are coupled to semiconductor laser 37. The emitters of first and second transistors 101 and 103 are coupled to ground through second and third resistors R2 and R3, respectively. According to the above construction, the current supplied to semiconductor laser 37 is generated by first and second transistors 101 and 103 in response to signals S14 and S18.

Again referring to FIG. 1, buffer 75, correcting code addition circuit 77, interleave circuit 79, control signal addition circuit 81 and modulator 83 are responsive to clock signal CK1. Clock signal CK1 is generated by reference clock generator 105 and programmable synthesizer 107. Reference clock generator 105, such as a quartz oscillator, generates a reference clock signal R. Programmable synthesizer 107 divides the frequency of reference clock R in accordance with signals S25 from CPU 34 so as to generate clock signals having a predetermined frequency.

Figure 5:
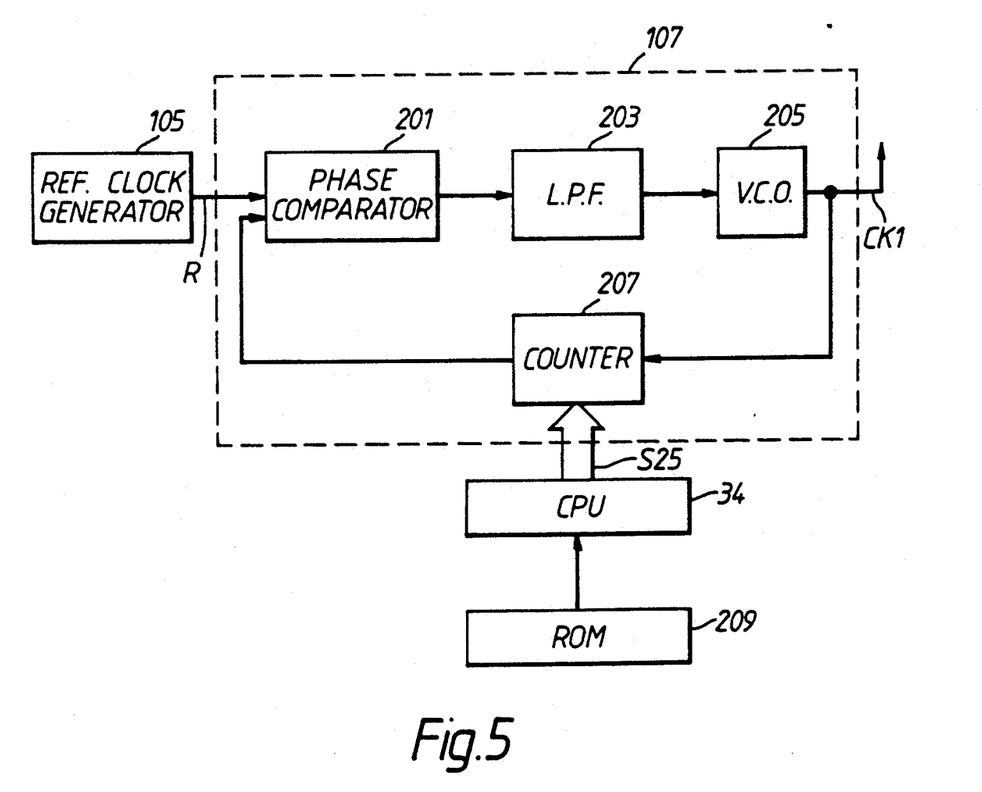
FIG. 5 is a block circuit diagram of a programmable synthesizer used in the optical disc device illustrated in FIG. 1.

With reference to FIG. 5, the details of programmable synthesizer 107 will be explained. Programmable synthesizer 107 includes phase comparator 201 which generates a signal representing the frequency difference between its two inputs. An output terminal of phase comparator 201 is coupled to an input terminal of LPF 203 which passes only the low frequency component of the signal. An output terminal of LPF 203 is coupled to an input terminal of a voltage controlled oscillator (VCO) 205 which generates a signal having a frequency dependent on the voltage of an input signal. The signal generated by VCO 205 is the clock signal CK1.

The output of VCO 205 is also coupled to an input of counter 207 which generates signals each time the number of signals output by VCO 205 reaches a predetermined number, the predetermined number being fixed by CPU 34. An output terminal of counter 207 is coupled to an input terminal of phase comparator 201. Another input terminal of phase comparator 201 is coupled to an output terminal of reference clock generator 105.

Programmable synthesizer 107 outputs clock signal CK1 synchronously with reference clock signal R. That is, the phase of clock signal CK1 is coincident with that of reference clock signal R because of phase comparator 201. The frequency of clock signal CK1 is, however, different than that of reference clock signal R due to counter 207. As described above, the frequency of clock signal CK1 is varied in accordance with signal S25 from ROM 209 through CPU 34.

ROM 209 stored the relationship between signals S25 and address information for addressing optical disc 11, such as track number and block number. The address information allows a determination of the distance between the center of optical disc 11 and the recording position at which signals are to be written or read. Thus, the address information is related to the radial position of information to be recorded or read on optical disc 11.

Figure 6:
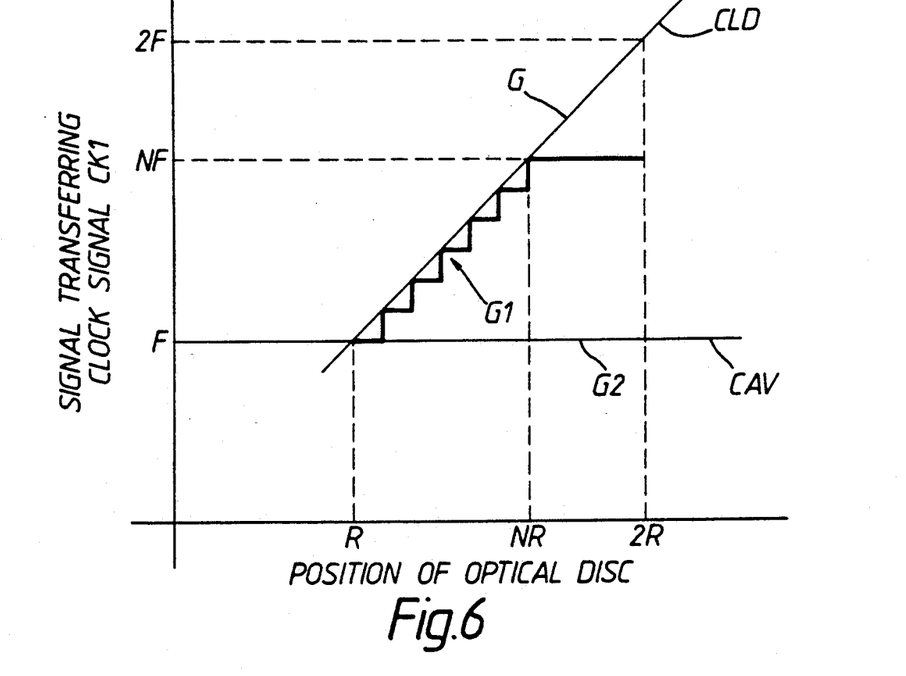
FIG. 6 illustrates the relationship between clock signal CK1 used in the optical disc device shown in FIG. 1 and radial position on the optical disc illustrated in FIG. 2.

FIG. 6 illustrates the relationship stored by ROM 209 in accordance with the present invention, i.e., the relationship between clock signal CK1 and the recording position as a function of radius. Signal S25 is related to clock signal CK1. Clock signal CK1 is substantially proportional to the radius of optical disc 11 within a specified area as indicated by a characteristic line G1 shown in FIG. 6.

Clock signal CK1 is varied discretely with respect to the recording position on optical disc 11. As shown in FIG. 6, clock signal CK1 is increased stepwise as the recording position is radially increased from R until the radius is NR where N is any number between one and two and R is a radius of optical disc 11 which defines an inner boundary of a first portion or area of the recording surface. When the radial position is greater than NR, clock signal CK1 is fixed at a constant value with respect to the recording position on optical disc 11.

FIG. 6 illustrates two reference characteristic lines G2 and G3. Line G2 represents the relationship between clock signal CK1 and the recording position in the CAV method. In accordance with the CAV method, optical disc 11 is rotated at a constant angular velocity and the frequency of clock signal CK1 is constant. Line G3 represents the relationship between clock signal CK1 and the recording position in the CLD method. In accordance with the CLD method, optical disc 11 is rotated at a constant angular velocity while the frequency of clock signal CK1 is varied so that an interval or spacing of adjacent recording positions or pits is set and maintained at a predetermined substantially constant value along the tracks. As the recording position increases radially from the center of optical disc 11, the linear or tangential velocity at the recording position becomes a more important factor. This is due to the constant angular velocity of optical disc. (Tangential velocity $v = \omega \times r$ where $\omega$ is the angular velocity and r is the radius.) Thus, in order to maintain a constant spacing between the recording positions or pits, the recording operation must be performed more quickly. For example, if the linear velocity at a recording position P1 is twice that at a recording position P2, the recording operation at position P1 must be performed within a time period equal to half the time period required at position P1. Thus, the frequency of clock signal CK1 linearly increases as a function of increasing radius on optical disc 11 in the CLD method.

Figure 7:
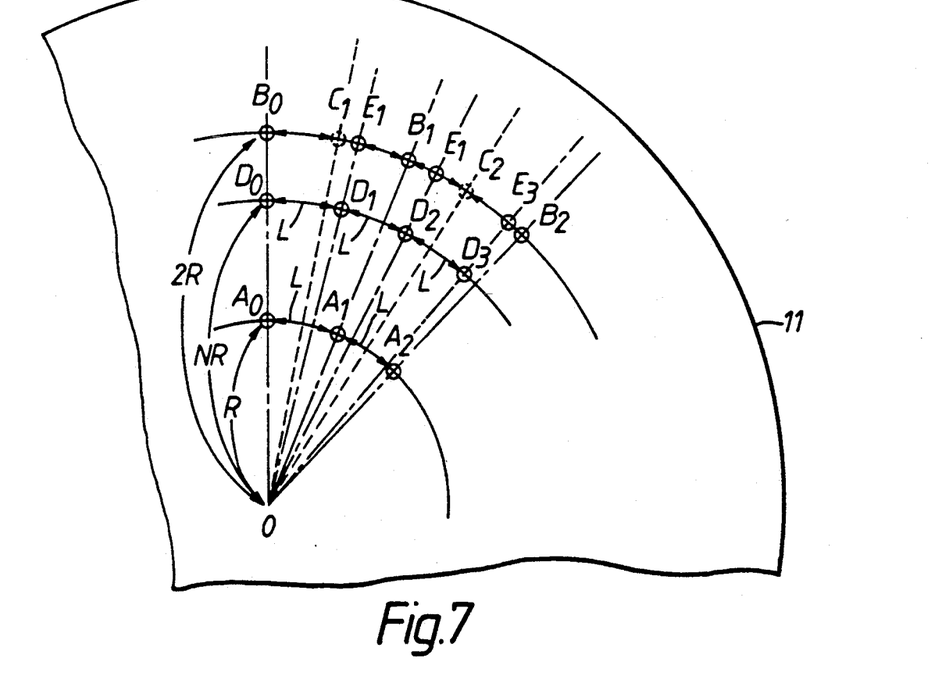
FIG. 7 illustrates the recording of pits on the optical disc illustrated in FIG. 2.

Characteristic line G2 indicates that the clock signal CK1 remains constant with respect to the radial position on optical disc 11 in the CAV method. That is, the frequency of clock signal CK1 remains constant regardless of the radial position on optical disc 11. With reference to FIG. 7, a plurality of pits, $A_0$, $A_1$, $A_2$ are formed with a predetermined spacing L therebetween on the track at radius R in accordance with the CAV method. At radius 2R, the track has a circumference equal to twice the circumference at radius R. Thus, pits $B_0$, $B_1$, $B_2$, are formed with a spacing equal to 2L or twice the predetermined interval L at radius R. This effect is due to the constant angular velocity of optical disc 11.

Characteristic line G3 is linearly increasing with respect to increasing radius of optical disc 11 from R to 2R as shown in FIG. 6. For example, the frequency of clock signal CK1 at radius 2R is twice as large as the frequency at radius R. Again referring to FIG. 7, if a plurality of pits $A_0$, $A_1$, $A_2$, are formed radius R, a plurality of pits $B_0$, $C_1$, $B_1$, $C_2$, $B_2$ are formed at 2R. The spacing of pits $B_0$, $C_1$, $B_1$, $C_2$, $B_2$ at radius 2R is equal to the spacing L at radius R. Thus, the recording density of pits, i.e., the spacing of pits along the track, is constant under the CLV method. However, as the radius of the recording position increases, the frequency of clock signal CK1 must be increased. Recording conditions are thus more severe for larger optical discs or as the recording position becomes further from the center of optical disc 11 in the CLV method and the recording quality decreases.

Characteristic line G1 linearly increases as the radius of the recording position increases on optical disc 11 from the radius R to NR. Characteristic line G1 is constant with respect to the radius of the recording position on optical disc 11 from the radius NR to 2R. Thus, in accordance with the present invention, the frequency of clock signal CK1 linearly increases from R to NR and remains constant from NR to 2R. The recording medium within the region defined by R and NR will be referred to as a first recording portion or area and the recording medium within the region defined by NR and 2R will be referred to as a second recording portion or area.

In accordance with clock signal CK1 as represented by characteristic line G1, a plurality of pits $A_0$, $A_1$, $A_2$, are formed with predetermined spacing L therebetween along the track at radius R as shown in FIG. 7. A plurality of pits $D_0$, $D_1$, $D_2$, are formed with predetermined spacing L therebetween along the track at radius NR. That is, the recording density of recording positions or pits along tracks between radius R and NR in the first recording area is constant. It should be pointed out that in a strict sense, the frequency of clock signal CK1 is varied stepwise from track to track so that the recording density of pits is not identically constant but varies very slightly. However, the difference of the frequency of clock signal CK1 between adjacent tracks is small so that the recording density of pits may be regarded as substantially constant.

At a radius greater than radius NR, clock signal CK1 is constant with respect to the radius of the recording position. That is, the frequency of clock signal CK1 is constant independent of the radius when the recording position is between NR and 2R. Thus, it is simple to control the frequency of clock signal CK1, and thereby the recording of data on optical disc 11. Thus, recording quality is not decreased at the outer radial portions of the disc. For example, in accordance with the present invention, a plurality of pits $B_0$, $E_1$, $E_2$ at radius 2R are formed under the CAV method. The spacing between adjacent pits is greater as the radius increases. That is, the recording density of pits decreases as the radius increases, i.e., the number of pits for each track remains constant at radii greater than NR.

The quantity of data or information which can be recorded on optical disc 11 (or recording capacity) will be explained with reference to FIGS. 8 and 9. The recording capacity of optical disc 11 is proportional to the dimensions illustrated in FIG. 8 and is dependent on the relationship between clock signal CK1 and the recording density. The recording capacity of optical disc 11 is related to the dimensions of the first and second recording areas.

Figure 8:
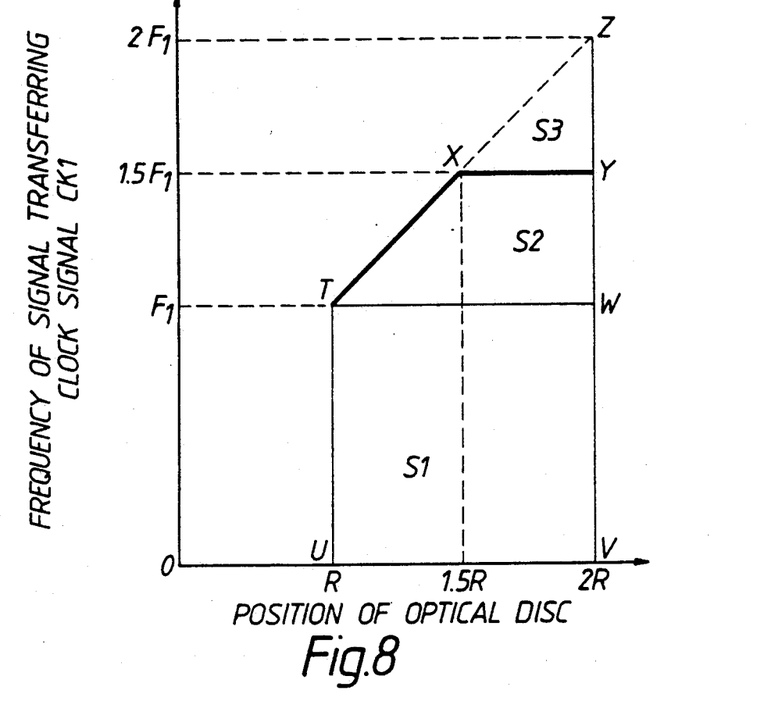
FIG. 8 illustrates the relationship between the frequency of the clock signal CK1 and radial position on the optical disc illustrated in FIG. 2.
Figure 9:
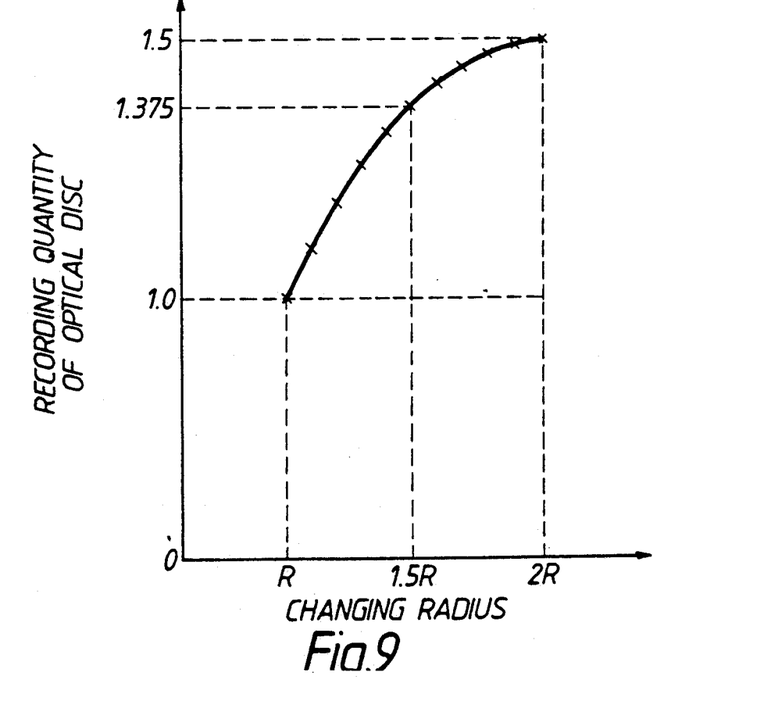
FIG. 9 illustrates the relationship between the recording capacity of the optical disc of FIG. 2 and the radius thereof.

The recording capacity of optical disc 11 between radii R and 2R in the CAV method when the frequency of clock signal CK1 is equal to a constant value $F_1$ is proportional to area S1 defined by the four points T, U, V and W shown in FIG. 8. The recording capacity of optical disc 11 between radii R and 2R, under the CLD method when the frequency of clock signal CK1 is linearly increasing from $F_1$ to $2F_1$, is proportional to the area $(S_1+S_2+S_3)$ defined by the four points T, U, V and Z.

The area $(S_1+S_2+S_3)$ is one and one-half times as large as the area $S_1$ since the area $(S_2+S_3)$ is one-half as large as the area $S_1$. However, it becomes difficult to control the frequency of clock signal CK1 as the recording point is located further from the center of optical disc 11 since the frequency of clock signal CK1 is higher at points far from the center of the disc. Thus, while the CLD method permits a greater recording capacity, recording quality at the outer radial portions of the disc is decreased. This situation is particularly important for discs having a large radius.

In accordance with the present invention, the frequency of clock signal CK1 linearly increases between radii R and NR and is constant between radii NR and 2R. N may, for example, be 1.5. Thus, in the present invention, the recording capacity of optical disc 11 is proportional to an area $(S_1+S_2)$ defined by the five points T, U, V, Y and X. The area $S_2$ represents an improvement over the recording capacity which may be achieved utilizing the CAV method. While the recording capacity is less than that which may be achieved with the CLD method, the problems associated with the high frequency of clock signal CK1 are avoided and improved, more accurate recording may be achieved.

The recording capacity of optical disc 11 is thus dependent on N, which determines the radius at which the frequency of clock signal CK1 changes from a series of radius-dependent values to a value which is a constant independent of radius. The radius at which this occurs will be referred to below as the change-over radius. The following table and FIG. 9 illustrates the relationship between the change-over radius and the recording capacity.

TABLE

| CHANGE OVER | RECORDING CAPACITY |
|---|---|
| 1.0 R | 1.0 |
| 1.1 R | 1.095 |
| 1.2 R | 1.18 |
| 1.3 R | 1.255 |
| 1.4 R | 1.32 |
| 1.5 R | 1.375 |
| 1.6 R | 1.42 |
| 1.7 R | 1.455 |
| 1.8 R | 1.48 |
| 1.9 R | 1.495 |
| 2.0 R | 1.5 |

As described above, the frequency increases of clock signal CK1 are not continuous, but rather occur in a stepwise fashion as the radius of the recording position changes. The difference in frequency between adjacent steps may be determined by considering the reproduction of signals on optical disc 11 as described below.

Figure 10:
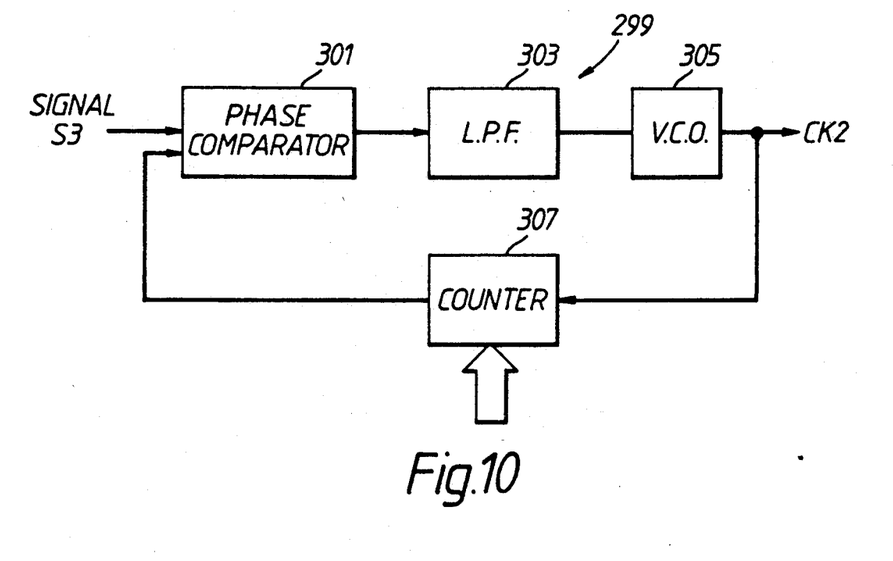
FIG. 10 is a conceptional block diagram of a clock extracting circuit used in the optical disc device of FIG. 1.

Signal S3, output from binary coding circuit 57, is generally not synchronous with clock signal CK1. Demodulator 59 includes a clock extracting circuit 299 as illustrated in FIG. 10. Clock extracting circuit 299 extracts clock signals (hereinafter referred to as clock signals CK2) from signal S3.

Clock signal CK2 is supplied to control signal eliminating circuit 61, de-interleave circuit 63, error correcting circuit 65 and buffer 67, which use clock signal CK2 in their operation. Demodulator 61 also uses clock signal CK2 for demodulating.

Clock extracting circuit 299 includes phase comparator 301, LPF 303, VCO 305 and counter 307 arranged in a similar manner as in programmable synthesizer 107 shown in FIG. 5. The differences between clock extracting circuit 299 and programmable synthesizer 107 reside in the input to phase comparator 301. Phase comparator 201 in programmable synthesizer 107 receives reference clock signal R. Phase comparator 301 in clock extracting circuit 299 receives signal S3, which is a binary signal generated by binary coding circuit 57.

Phase comparator 301 compares the phase difference between signal S3 and a signal from counter 307 when an edge of signal S3 (a binary signal) is detected. That is, phase comparator 301 assures the phase difference between signal S3 and the signal from counter 307 at the starting point, i.e., the edge of signal S3.

Figure 11:
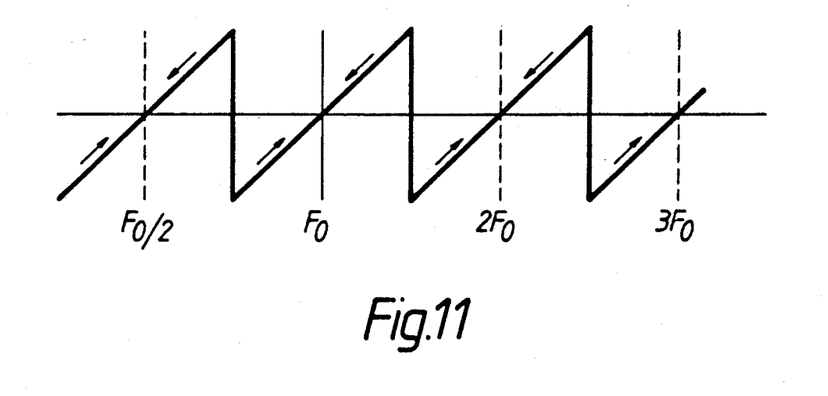
FIG. 11 illustrates the characteristic of phase lock of the clock extracting circuit shown in FIG. 10.

The phase comparing characteristic of phase comparator 301 is as shown in FIG. 11. There are a plurality of points (hereinafter referred to as lock points) for locking a frequency of clock signal CK2. It is possible for clock signal CK2 to drop into a different lock point from that intended to be locked.

Figure 12:
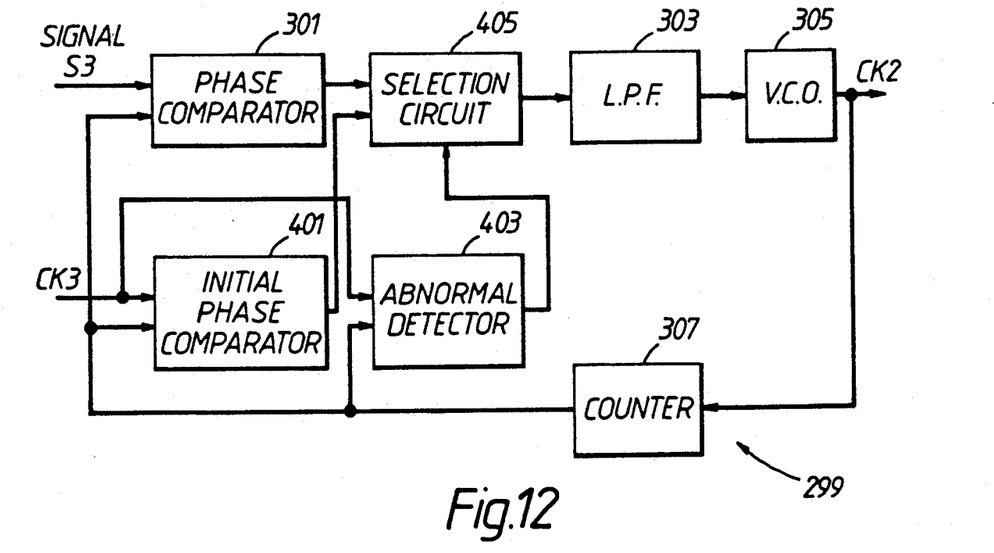
FIG. 12 is a block diagram of the clock extracting circuit considering the characteristic of phase lock of the clock extracting circuit.

Considering a plurality of lock points, the clock extracting circuit is constructed as shown in FIG. 12. Initial phase comparator 401, abnormal detector 403 and selection circuit 405 are added into the construction shown in FIG. 10.

Initial phase comparator 401 compares clock signal CK2 with a reference clock signal CK3. Reference clock signal CK3 is generated in the same manner as clock signal CK1 in accordance with address data indicating the position for reproducing signals on optical disc 11. When CPU 34 receives the address data information for reproducing data, CPU 34 determines the frequency of clock signal CK1 by use of a look-up table stored in ROM 209. CPU 34 then generates reference clock signal CK3, the frequency of which is the same as that of clock signal CK1 in accordance with the address data.

Abnormal detector 403 detects whether the frequency of the input counter signal from counter 307 to phase comparator 301 or initial phase comparator 401 exceeds $(100\pm 6)$ % of the frequency of reference clock signal CK3. Selection circuit 405 selects an output from either phase comparator 301 or initial phase comparator 401 for passage to LPF 303. First, an output of initial phase comparator 401 is selected. Then, once the initial loop is established, if the frequency of the input signal to LPF 303 is maintained within $(100\pm 6)$ % of the frequency of reference clock signal CK3, abnormal detector 403 outputs a signal which causes selection circuit 405 to continue to pass an output of initial phase comparator 301 to LPF 303. If the frequency of the input signal to LPF 303 exceeds $(100\pm 6)$ % of the frequency of reference clock signal CK3, abnormal detector 403 maintains an output signal which causes selection circuit 405 to again select an output of initial phase comparator 401 to LPF 303. Abnormal detector 403 outputs a signal to selection circuit 405 to switch selection circuit 405 from one selection to another.

The operation of the clock extracting circuit shown in FIG. 12 will now be explained. It will be assumed for illustrative purposes that optical head 35 has reproduced data at a first position on optical disc 11 and then attempts to access a second position in accordance with address data input by an operator. First, CPU 34 determines the frequency of reference clock signal CK3 corresponding to the address data, i.e., the radius, at the second position. CPU 34 then causes optical head 35 to access the second position. Reference clock signal CK3 determined by CPU 34 is supplied to initial phase comparator 401. After a short time clock signal CK2 becomes synchronous with reference clock signal CK3. The frequency of clock signal CK2 becomes fixed at one of the lock points.

Next, selection circuit 405 disconnects the output terminal of initial phase comparator 401 with the input terminal of LPF 303 and connects the output terminal of phase comparator 301 thereto. In this arrangement, the phase of clock signal CK2 is synchronous with that of signal S3. By means of initial phase comparator 401, the frequency of clock signal CK2 becomes coincident with that of clock signal CK3. The frequency of reference clock signal CK3 is equal to that of signal S3 if optical head 35 accesses the second position correctly.

As described above, the frequency of clock signal CK1, which is used for recording on optical disc 11, is varied stepwise in so-called frequency jumps. A frequency jump of clock signal CK1 exists at the boundary between respective tracks. The frequency jump is sufficiently large that clock signal CK2 cannot be phase locked with clock signal CK3 when the access position of the optical head is different than the position that the operator inputs to be accessed.

This is because the frequency of reference clock signal CK3 is different than that of signal S3. CPU 34 generates reference clock signal CK3 in accordance with the position that the operator inputs to position to be accessed. Signal S3 is generated in accordance with the position accessed by optical head 35. For illustrative purposes, it will be assumed, optical head 34 accesses a position different from the desired position to be accessed. By means of a first loop including initial phase comparator 401, LPF 303, VCO 305 and counter 307, clock signal CK2 is made synchronous with reference clock signal CK3. Strictly speaking, the frequency of clock signal CK2 is coincident with that of reference clock signal CK3. Next, a second loop comprising phase comparator 301, LPF 303, VCO 305 and counter 307 is established. The frequency of signal S3, however, is different than that of clock signal CK2 since the accessed position is different than the desired position to be accessed. The second loop is unable to phase lock clock signal CK2 if the frequency jump between tracks is sufficiently large. Since the phase lock operation fails, the frequency of clock signal CK2 is not fixed at the correct value.

The optical disc device is unable to demodulate the data on optical disc 11 if the frequency of clock signal CK2 is significantly different than the correct value. If so, the optical disc device is unable to determine the actual position that optical head 35 accesses using the phase lock loop arrangement.

However, in accordance with the present embodiment, the frequency jump between tracks is set smaller than the largest frequency fluctuation at which the optical disc device is able to demodulate the modulated header data on optical disc 11 utilizing the 2-7 modulation code. Thus, if optical head 35 erroneously accesses an adjacent track, the optical disc device is able to demodulate the modulated header data on optical disc 11 using the 2-7 code. The modulated header data includes the address data of the track. The header data permits the CPU to determine the current position accessed by optical head 35 so that the optical disc device controls optical head 35 to attempt to access the desired position.

As described above, the optical disc device adopts the 2-7 code modulation. The largest frequency fluctuation from the correct frequency for which the 2-7 code will work is ±6.25%. Thus, it is desirable that the frequency jump between tracks be set smaller than ±6%. In the present embodiment, the frequency jump is set at 1%. Abnormal detector 403 determines no abnormal state exists when the frequency difference is less than 6% and determines an abnormal state exists when the frequency difference is greater than 6%.

In short, the 2-7 code modulation can read or reproduce information on the optical disc even if CK2 is not equal to the frequency of the desired track if CK2 is within a certain frequency range. The 2-7 method reads the header information only. The phase lock loop is necessary to permit accurate reading and recording of information on the disc. By making the frequency jump between adjacent tracks small, the CPU can read header information more accurately, but not accurately enough to read the recorded information itself.

The laser power of semiconductor laser 37 will now be explained. The optical disc device in accordance with the present embodiment utilizes a heat mode recording method. In this method, heat generated by a laser beam changes the surface of optical disc 11, e.g., makes pits on optical disc 11. Recording depends on the energy J generated by the laser beam and the sensitivity of optical disc 11. Energy J generated by the laser beam is described by the following equation:

$$J = \text{(the power } P \text{ of laser 37 in watts)} \times \text{(the time duration } T_p \text{ of power-on time of the laser in seconds)}$$

In a method in which the angular velocity of optical disc 11 is constant, e.g., the CAV or the CLD method, the linear velocity increases as a function of the increasing radius of the recording position. For illustrative purposes, it will be assumed that the radius at the outermost point of the recording area is twice as great as the radius at the innermost point of the recording area. The linear velocity at the outermost point is therefore twice as fast as that at the innermost point since the angular velocity of optical disc 11 is constant. The doubling of the linear velocity affects the time $T_p$. For example, the energy J for recording at the innermost point is determined by $J_1 = P_1 \times T_{p1}$, where $P_1$ indicates the laser power and $T_p$ indicates the time duration at the innermost point of the recording area. In this case, the effective time duration at the outermost point is $T_{p1}/2$ or half of $T_{p1}$ because the linear velocity has been doubled. Thus, the energy $J_2$ at the outermost point is given by $J_2 = P_2 \times (T_{p1})/2$.

If the effective recording conditions necessary for high quality recording are constant regardless of the radial location of the recording points, the energy $J_1$ at the innermost point must be equal to the energy $J_2$ at the outermost point. Therefore, $P_2$ must be set at $2P_1$. However, it is difficult to adjust the laser power to be twice as strong as the laser power at the innermost position. Thus, the effective recording conditions in the CAV or CLD method are extremely difficult to achieve.

Figure 13:
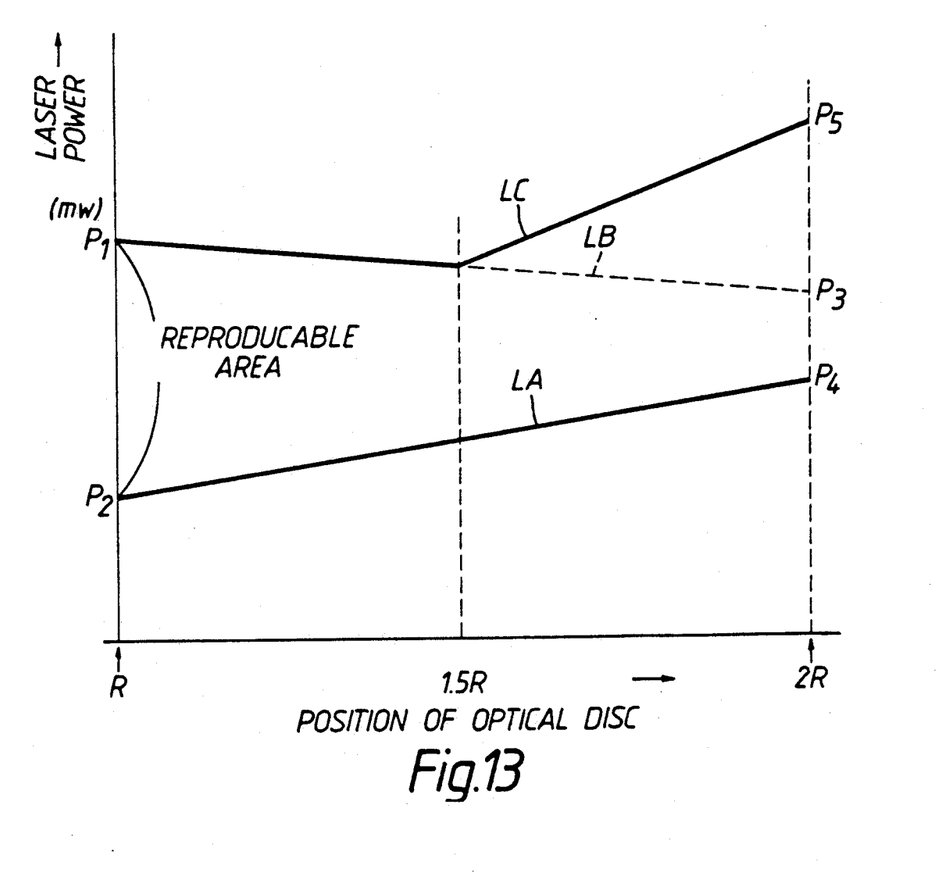
FIG. 13 illustrates recording powers of a laser used in the optical disc device shown in FIG. 1.

FIG. 13 illustrates the relationship between laser power and radial position on the optical disc. A linear line LA and a bent line LC indicate the power margins of semiconductor laser 37. The time length $T_p$ is constant regardless of the recording position, i.e., the radius of optical disc 11. To compute the margin of the power of semiconductor laser 37 as shown in FIG. 13, the following steps are required.

First, the time duration $T_p$ and the most suitable interval between adjacent pits along the track are determined at the innermost point, e.g., the radius R. Then, a plurality of recordings are performed as the power of semiconductor laser 37 is varied. Next, optical head 35 attempts to reproduce the recorded pits as the power of semiconductor laser 37 is varied. In this case, a reproducible range of the recording power of semiconductor laser 37 extends from $P_1$ to $P_2$ as shown in FIG. 13.

In the same manner as above, the reproducible range of laser 37 on a radius from the inner point R to the outer point 2R is examined. As shown in FIG. 13, a group of the smallest laser powers of laser 37 at each point on the radius form a line LA. The smallest power of laser 37 at the innermost point (radius R) is $P_2$ and the smallest power of laser 37 at the outermost point (radius 2R) is $P_4$. $P_4$ is larger than $P_2$ since the linear speed at the outermost point (radius 2R) is twice as large as the linear speed at the innermost point (radius R). The energy density which laser 37 supplies to the surface of optical disc 11 depends on the angular velocity of optical disc 11.

A group of the largest powers of laser 37 at each point on the radius makes a line LC. A dotted line LB indicates the largest power of laser 87 under the CLD method. The largest power of laser 37 according to the present embodiment is explained in comparison with that under the CLD as follows.

Under the CLD method, the largest power of laser 37 at the innermost point as indicated by P1 shown in FIG. 13. The largest power of laser 37 at the outermost point is indicated by P3 shown in FIG. 13. P3 is smaller than P1 since the linear velocity at the outermost point is twice that at the innermost point. Furthermore, the time duration $T_p$ is constant at each point on optical disc 11. Thus, the length of the surface of optical disc 11 that laser 37 gives laser power is larger as the recording position on optical disc 11 is further from the center of optical disc 11. If the power of laser 37 is large enough, larger pits are formed at the outer portions of optical disc 11. As the size of pit increases, the margin of recording error decreases. As is well known, it is desirable that the margin of recording is large.

In the present embodiment, the CAV method is adopted when the radius NR is greater than 1.5 R. In the CAV method, the frequency of clock signal CK1 remains constant and the spacing between adjacent pits is greater since the angular velocity is constant. As the spacing increases, the margin of recording error increases.

It should be noted that the relationship between R, NR, and 2R is illustrative of one embodiment of the invention. The teachings of the invention may be applied to different optical discs utilizing different relationships.

Other objects, features and advantages of the present invention will become apparent from the above detailed description. It should be understood, however, that the detailed description and specific examples, while indicating preferred embodiments of the invention, are given by way of illustrations only, since various changes and modifications within the spirit and scope of the invention will become apparent to those skilled in the art.

We claim:

1. An optical memory device for recording information in a plurality of tracks on an optical recording medium responsive to light incident thereon, said optical memory device comprising:
   motor means for rotating the recording medium at a predetermined constant speed;
   clock means for generating clock signals having predetermined frequencies;
   recording means responsive to the clock means for recording information on the optical recording medium;
   position detecting means for detecting the position of the recording means in relation to said optical recording medium; and
   control means for controlling the recording means and the clock means such that information is recorded in a first predetermined arrangement on a first portion of the optical recording medium and in a second predetermined arrangement on a second portion of the optical recording medium,
   wherein the frequency of the clock signals generated by the clock means increases substantially linearly as the recording means is moved radially in the first portion in order that the recording positions of information in the first portion have substantially constant spacing therebetween and the frequency of the clock signals is a first value when the recording means is positioned at a first track located in the first portion of said optical recording medium and a second, different value when the recording means is positioned in a second track in the first portion of said optical recording medium.

2. The memory device according to claim 1 wherein said recording medium comprises a bismuth tellurium alloy.

3. The memory device according to claim 1 wherein said recording means records information by generating a phase transition in portions of said recording medium.

4. The optical memory device according to claim 1 wherein said first portion of said optical recording medium includes an area between first and second predetermined radii from the center of the optical memory, the second predetermined radius being one and one-half times the first predetermined radius.

5. The optical memory device according to claim 1 wherein said control means controls said recording means and said clock means such that recording positions of information in tracks in the second portion of said optical recording medium have a spacing therebetween dependent on the location of the tracks on said optical recording medium.

6. The optical memory device according to claim 1 wherein the clock frequency between adjacent tracks differs by approximately 1%.

7. The optical memory device of claim 6, wherein said optical recording medium includes an optical disc, the first portion of the optical recording medium comprises a first annular area defined by a first radius R1 and a radius NR on said disc, the second portion of the optical recording medium comprises a second annular portion defined by the radius NR and a second radius R2 on said disc, and the second predetermined radius is three-quarters of the radius of the optical disc.

8. The optical memory device according to claim 6 wherein the first portion of the optical recording medium comprises a first annular area defined by a first radius R1 and a radius NR, where NR equals $1.5 \times R1$, the second portion of the optical recording medium comprises a second annular area defined by the radius NR and a second radius R2, where R2 equal $2 \times R1$.

9. The optical memory device of claim 1, wherein said control means controls said clock means to generate clock signals with frequencies selected such that the frequencies are constant in regard to the position of said recording means in said second portion of the optical recording medium.

10. The optical memory device of claim 1, wherein the clock signals are generated at frequencies corresponding to each track of the optical memory, the track being a unit of recording on the optical memory.

11. The optical memory device of claim 1, further comprising a reproducing means for reproducing information recorded by said recording means, wherein said frequencies generated by said clock means are within a predetermined range of values at which said reproducing means my reproduce information.

12. The optical memory device according to claim 1, wherein the frequency of the clock signals generated by the clock means is substantially constant as the recording means is moved radially in the second portion in order that the recording positions of information in the second portion have spacing therebetween dependent on the location of the recording means in relation to the optical recording medium.

* * * * *